(12) United States Patent
Hu et al.

(10) Patent No.: US 12,415,561 B2
(45) Date of Patent: Sep. 16, 2025

(54) STROLLER FRAME AND STROLLER

(71) Applicant: Hubei YTS Group LTD, Hanchuan (CN)

(72) Inventors: Chengpeng Hu, Hanchuan (CN); Shanxi Yue, Hanchuan (CN)

(*) Notice: Subject to any disclaimer, the term of this patent is extended or adjusted under 35 U.S.C. 154(b) by 407 days.

(21) Appl. No.: 18/143,172

(22) Filed: May 4, 2023

(65) Prior Publication Data

US 2024/0017758 A1     Jan. 18, 2024

(30) Foreign Application Priority Data

Jul. 12, 2022   (CN) ......................... 202221833705.8

(51) Int. Cl.
   *B62B 7/08*    (2006.01)
   *B62B 7/06*    (2006.01)
   *B62B 9/20*    (2006.01)

(52) U.S. Cl.
   CPC .............. *B62B 7/08* (2013.01); *B62B 7/064* (2013.01); *B62B 9/20* (2013.01); *B62B 2205/22* (2013.01)

(58) Field of Classification Search
   CPC .. B62B 7/08; B62B 7/064; B62B 7/06; B62B 9/20; B62B 2205/22; B62B 2205/20
   See application file for complete search history.

(56) References Cited

U.S. PATENT DOCUMENTS

| | | | |
|---|---|---|---|
| 11,230,314 B2 * | 1/2022 | Liwei | ........................ B62B 7/10 |
| 2003/0020259 A1 * | 1/2003 | Tai | ............................ B62B 7/08 280/647 |

* cited by examiner

*Primary Examiner* — John D Walters
(74) *Attorney, Agent, or Firm* — Patrick M. Torre; Stites & Harbison PLLC (57) ABSTRACT

Provided are a stroller frame and a stroller. A first rotating shaft and a second rotating shaft are provided at intervals on a stroller folding mechanism of the stroller frame, which is hinged to a handle assembly through the first rotating shaft, and is hinged to one end of a handrail assembly through the second rotating shaft; the handle assembly is hinged to a rear foot assembly through a third rotating shaft, the rear foot assembly is provided with a fourth rotating shaft, and one end of the handrail assembly and one end of a front foot assembly are both hinged to the rear foot assembly through the fourth rotating shaft; and the seat assembly has one side hinged to the handle assembly through a fifth rotating shaft and the other side hinged to the front foot assembly through a sixth rotating shaft.

20 Claims, 7 Drawing Sheets

STROLLER FRAME AND STROLLER

CROSS-REFERENCE TO RELATED APPLICATIONS

The present disclosure claims the priority to the Chinese Patent Application No. 2022218337058, entitled "Stroller Frame and Stroller", and filed with the China Patent Office on Jul. 12, 2022, the entire contents of which are incorporated herein by reference.

TECHNICAL FIELD

The present disclosure relates to the technical field of strollers, and in particular to a stroller frame and a stroller.

BACKGROUND ART

A frame of a baby stroller is generally of a foldable structure, and an existing stroller frame generally includes a front foot rod, a rear foot rod, a handle rod, and a seat frame, wherein the front foot rod, the rear foot rod, and the handle rod are hinged at one point and are locked by a locking structure, the seat frame is hinged between the front foot rod and the rear foot rod, and a locking structure is also installed at a hinge position between the seat frame and the foot rods to lock the seat frame.

When the stroller needs to be folded, a user needs to unlock the whole frame simultaneously with both hands, thus causing inconvenience in operation and use.

SUMMARY

The present disclosure aims at providing a stroller frame and a stroller, so as to alleviate the technical problem existing in the prior art that when the stroller needs to be folded, the user needs to unlock the whole frame simultaneously with both hands, thus causing inconvenience in operation and use.

In a first aspect, the present disclosure provides a stroller frame, including a handle assembly, a stroller folding mechanism, a handrail assembly, a front foot assembly, a rear foot assembly, a seat assembly, and an unlocking mechanism;

a first rotating shaft and a second rotating shaft are provided at intervals on the stroller folding mechanism, wherein the stroller folding mechanism is hinged to the handle assembly through the first rotating shaft, and the stroller folding mechanism is hinged to one end of the handrail assembly through the second rotating shaft;
  the handle assembly is hinged to the rear foot assembly through a third rotating shaft, wherein the rear foot assembly is provided with a fourth rotating shaft, and one end of the handrail assembly away from the stroller folding mechanism and one end of the front foot assembly are both hinged to the rear foot assembly through the fourth rotating shaft;
  one side of the seat assembly is hinged to the handle assembly through a fifth rotating shaft, and the other side is hinged to the front foot assembly through a sixth rotating shaft;
  a locking mechanism is provided on the handle assembly, wherein the locking mechanism and the first rotating shaft are arranged at intervals, a locking portion matched with the locking mechanism is provided on the stroller folding mechanism, and the locking mechanism is configured to be connected with the locking portion when the stroller frame is unfolded, so as to limit a rotation of the stroller folding mechanism about the first rotating shaft relative to the handle assembly; and
  the unlocking mechanism is connected to the locking mechanism, for driving the locking mechanism away from the locking portion, so as to unlock the locking mechanism and the locking portion.

In an optional embodiment, the locking mechanism is an insertion member, the locking portion is a slot, and the insertion member is slidably mounted on the handle assembly along a direction parallel to the first rotating shaft.

In an optional embodiment, an elastic member is connected between the insertion member and the handle assembly, wherein the elastic member is configured to store energy when the insertion member exits the slot.

In an optional embodiment, the unlocking mechanism is a pull rope; and
  the handle assembly is of a hollow structure, and the pull rope is arranged in the handle assembly, wherein one end of the pull rope is connected to the insertion member, and the other end is arranged at a top portion of the handle assembly.

In an optional embodiment, a guiding member is further included, the handle assembly is hollow, and the guiding member is fixed in the handle assembly; and
  one side of the guiding member facing the locking portion is provided with a groove, and a side wall of the handle assembly is provided with a through hole in communication with the groove, wherein one end of the insertion member is arranged in the groove, and the other end can protrude out of the handle assembly or retract into the handle assembly after passing through the through hole of the handle assembly.

In an optional embodiment, a guiding channel is provided from a bottom of the groove to a side of the guiding member facing back to the locking portion, one end of the pull rope is connected to the insertion member, and the other end passes through the guiding channel and then is provided at the top portion of the handle assembly.

In an optional embodiment, a stroller folding holder is fixed on the handle assembly, and the stroller folding mechanism is hinged to the stroller folding holder through the first rotating shaft; and
  the stroller folding holder is provided with an exposed hole corresponding to the locking mechanism, and the locking mechanism can pass through the exposed hole of the stroller folding holder and then be connected to the locking portion.

In an optional embodiment, a handle connecting member is fixed on the rear foot assembly, and the handle assembly is hinged to the handle connecting member through the third rotating shaft.

In an optional embodiment, one end of the handle assembly is fixed with a support member, and one side of the seat assembly is hinged to the support member through the fifth rotating shaft.

In a second aspect, the present disclosure provides a stroller, including the stroller frame according to any one of the preceding embodiments.

The stroller frame provided in the present disclosure includes the handle assembly, the stroller folding mechanism, the handrail assembly, the front foot assembly, the rear foot assembly, the seat assembly, and an unlocking mechanism; the first rotating shaft and the second rotating shaft are provided at intervals on the stroller folding mechanism, wherein the stroller folding mechanism is hinged to the handle assembly through the first rotating shaft, and the stroller folding mechanism is hinged to one end of the handrail assembly through the second rotating shaft; the handle assembly is hinged to the rear foot assembly through the third rotating shaft, wherein the rear foot assembly is provided with the fourth rotating shaft, and one end of the handrail assembly away from the stroller folding mechanism and one end of the front foot assembly are both hinged to the rear foot assembly through the fourth rotating shaft; one side of the seat assembly is hinged to the handle assembly through the fifth rotating shaft, and the other side is hinged to the front foot assembly through the sixth rotating shaft; the locking mechanism is provided on the handle assembly, the locking mechanism and the first rotating shaft are arranged at intervals, and the locking portion matched with the locking mechanism is provided on the stroller folding mechanism, wherein the locking mechanism is configured to be connected with the locking portion when the stroller frame is unfolded, so as to limit rotation of the stroller folding mechanism about the first rotating shaft relative to the handle assembly; and the unlocking mechanism is connected to the locking mechanism, for driving the locking mechanism away from the locking portion, so as to unlock the locking mechanism and the locking portion. In the stroller frame, generally, taking the rear foot assembly as a dividing line, the stroller folding mechanism, the handle assembly, and the handrail assembly are provided on one side of the rear foot assembly, and the seat assembly and the front foot assembly are provided on the other side of the rear foot assembly. In the stroller frame provided in the present disclosure, when the stroller frame is unfolded, the stroller folding mechanism, the handle assembly, the rear foot assembly, and the handrail assembly can form a quadrilateral structure with the first rotating shaft, the second rotating shaft, the third rotating shaft, and the fourth rotating shaft as vertices, and the handle assembly, the rear foot assembly, the seat assembly, and the front foot assembly can form a quadrilateral structure with the third rotating shaft, the fourth rotating shaft, the fifth rotating shaft, and the sixth rotating shaft as vertices. When the stroller frame is unfolded, the locking mechanism is connected to the locking portion, and rotation of the stroller folding mechanism about the first rotating shaft relative to the handle assembly can be limited, in this case, degree of freedom at the first rotating shaft is limited, the first rotating shaft cannot rotate, and the stroller folding mechanism cannot rotate. After the rotating function of the first rotating shaft is lost, the quadrangle formed by connecting the first rotating shaft, the second rotating shaft, the third rotating shaft, and the fourth rotating shaft is changed into a triangle formed by connecting the second rotating shaft, the third rotating shaft, and the fourth rotating shaft, in this case, the handle assembly, the rear foot assembly, and the handrail assembly can form a triangle-like structure. As the stability of the triangle is the best and neither the stroller folding mechanism nor the first rotating shaft can rotate, the effect of locking the handle assembly, the rear foot assembly, and the handrail assembly can be achieved. Moreover, as both the handle assembly and the rear foot assembly are locked, the handle assembly cannot rotate, and the third rotating shaft cannot rotate either, in this case, after the rotating function of the third rotating shaft is lost, the quadrangle formed by connecting the third rotating shaft, the fourth rotating shaft, the fifth rotating shaft, and the sixth rotating shaft is changed into a triangle formed by connecting the fourth rotating shaft, the fifth rotating shaft, and the sixth rotating shaft, and the rear foot assembly, the seat assembly, and the front foot assembly can form a triangle-like structure. As the stability of the triangle is the best and neither the handle assembly nor the third rotating shaft can rotate, the effect of locking the rear foot assembly, the seat assembly, and the front foot assembly can be achieved. So far, the whole structure of the stroller frame is locked, and can be kept stable in an unfolded state. When the stroller frame needs to be folded, the rear foot assembly can be first kept upright, and then the unlocking mechanism is used to drive the locking mechanism away from the locking portion, so that the locking mechanism and the locking portion are unlocked, in this case, the degree of freedom of the first rotating shaft is no longer restricted, and the first rotating shaft can rotate. As the stroller folding mechanism, the handle assembly, the rear foot assembly, and the handrail assembly form the quadrilateral structure with the first rotating shaft, the second rotating shaft, the third rotating shaft, and the fourth rotating shaft as vertices, and the handle assembly, the rear foot assembly, the seat assembly, and the front foot assembly form a quadrilateral structure with the third rotating shaft, the fourth rotating shaft, the fifth rotating shaft, and the sixth rotating shaft as vertices, when the degree of freedom of the first rotating shaft is no longer restricted, the two quadrilateral structures above can be respectively folded automatically on the two sides of the rear foot assembly due to their own gravity, thus, the automatic stroller folding function can be achieved when the frame is kept standing.

Compared with the prior art, for the stroller frame provided in the present disclosure, the stroller folding mechanism and the first rotating shaft can be unlocked through driving the locking mechanism to move away from the locking portion by the unlocking mechanism, thus all the rotating shafts of the stroller frame can be unlocked, so that the handle assembly, the stroller folding mechanism, the handrail assembly, the front foot assembly, the rear foot assembly, and the seat assembly of the stroller frame can all rotate freely, and can be automatically folded on two sides of the rear foot assembly when the rear foot assembly is kept upright, further achieving the function of unlocking through one-hand operation and then automatically folding the stroller through self-weight of the frame, and the user does not need to perform the unlocking simultaneously with two hands, which can improve the convenience of operation.

The stroller provided in the present disclosure includes the above stroller frame, therefore, the stroller provided in the present disclosure has the same beneficial effects as the above stroller frame.

BRIEF DESCRIPTION OF DRAWINGS

In order to illustrate the technical solutions in the embodiments of the present disclosure or the prior art more clearly, the drawings that need to be used in the description of the embodiments or the prior art are briefly introduced as follows. Obviously, the drawings in the following description show some embodiments of the present disclosure. For those ordinarily skilled in the art, other drawings can also be obtained based on these drawings without using any creative efforts.

Reference signs: 1—handle assembly; 10—third rotating shaft; 11—locking mechanism; 12—stroller folding holder; 120—exposed hole; 13—support member; 14—upper handle rod; 15—lower handle rod; 16—seventh rotating shaft; 2—stroller folding mechanism; 20—first rotating shaft; 21—second rotating shaft; 22—locking portion; 3—handrail assembly; 4—front foot assembly; 5—rear foot assembly; 50—fourth rotating shaft; 51—handle connecting member; 6—seat assembly; 60—fifth rotating shaft; 61—sixth rotating shaft; 7—unlocking mechanism; 8—elastic member; 9—guiding member; 90—groove; 91—guiding channel.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with the drawings in the embodiments of the present disclosure, and apparently, some but not all embodiments of the present disclosure are described. Generally, components in the embodiments of the present disclosure described and shown in the drawings herein may be arranged and designed in various different configurations.

Therefore, the detailed description below of the embodiments of the present disclosure provided in the drawings is not intended to limit the claimed scope of the present disclosure, but merely represents chosen embodiments of the present disclosure. Based on the embodiments in the present disclosure, all of other embodiments obtained by those ordinarily skilled in the art without using any creative efforts shall fall within the scope of protection of the present disclosure.

Some embodiments of the present disclosure are described in detail below in combination with the drawings. The following embodiments and features in the embodiments may be combined with each other without conflict.

EMBODIMENTS

Figure 3:
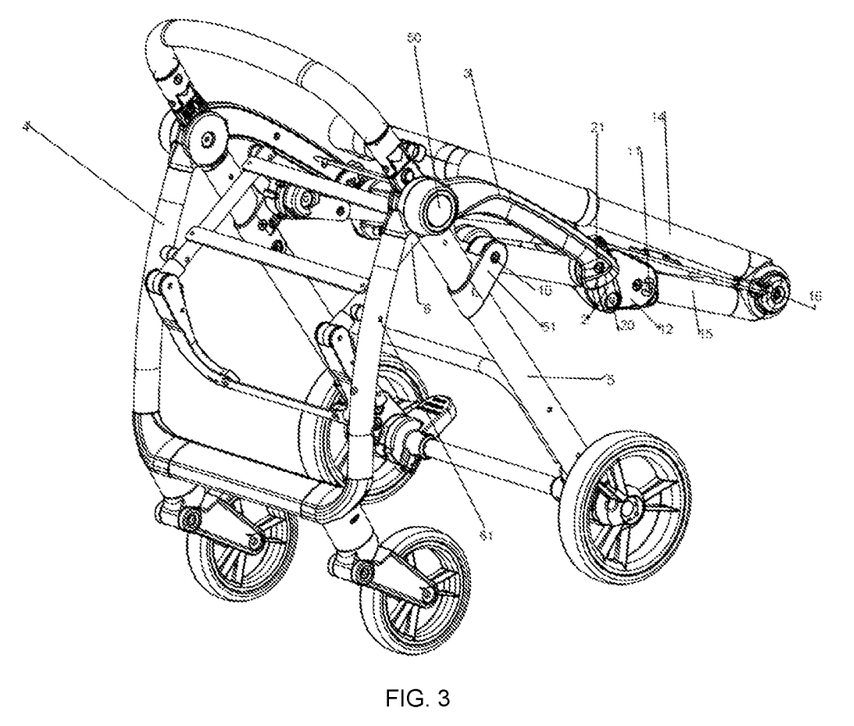
FIG. 3 is a structural schematic diagram of the stroller frame provided in an embodiment of the present disclosure when being folded.
Figure 4:
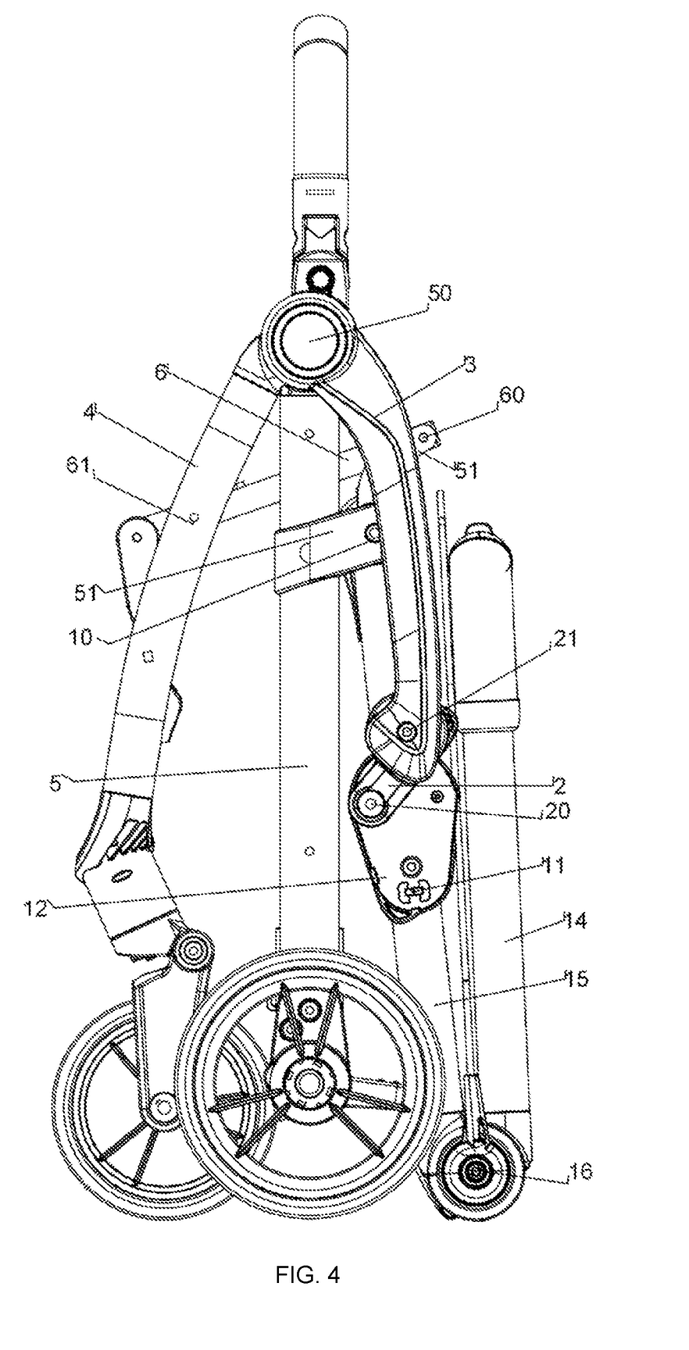
FIG. 4 is a structural schematic diagram of the folded stroller frame provided in an embodiment of the present disclosure.
Figure 5:
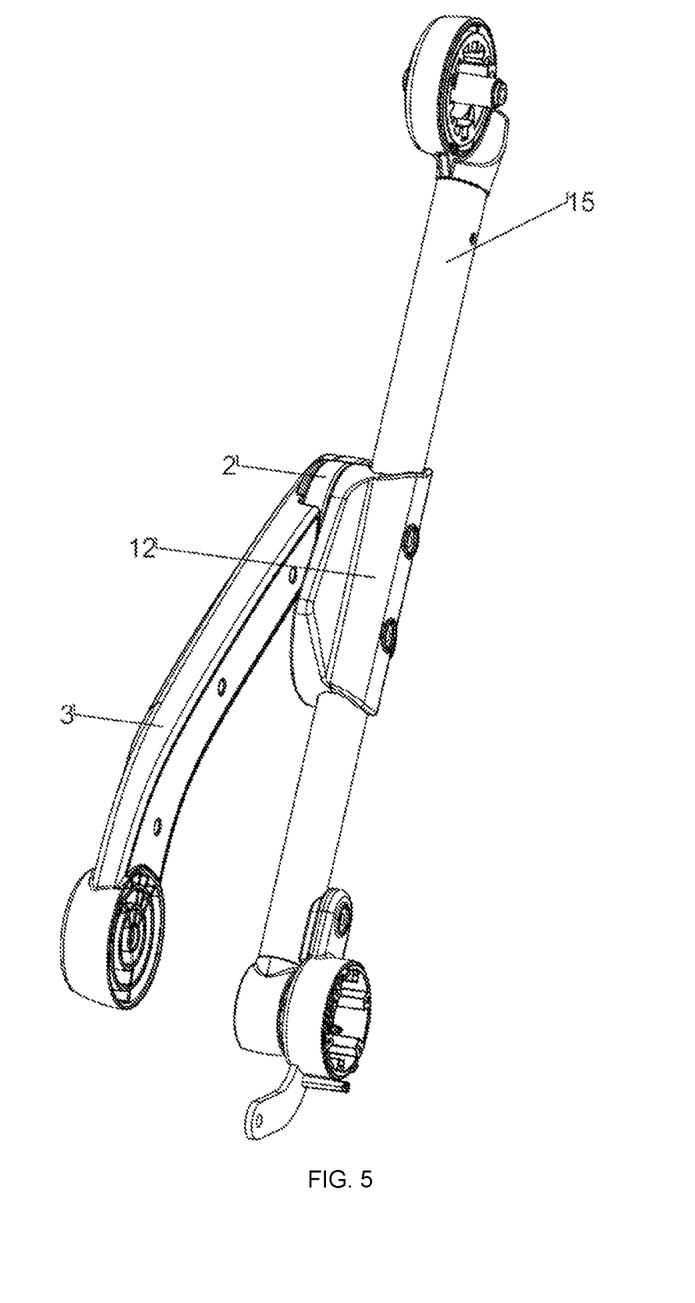
FIG. 5 is a structural schematic diagram of the handle assembly and the handrail assembly provided in an embodiment of the present disclosure.
Figure 6:
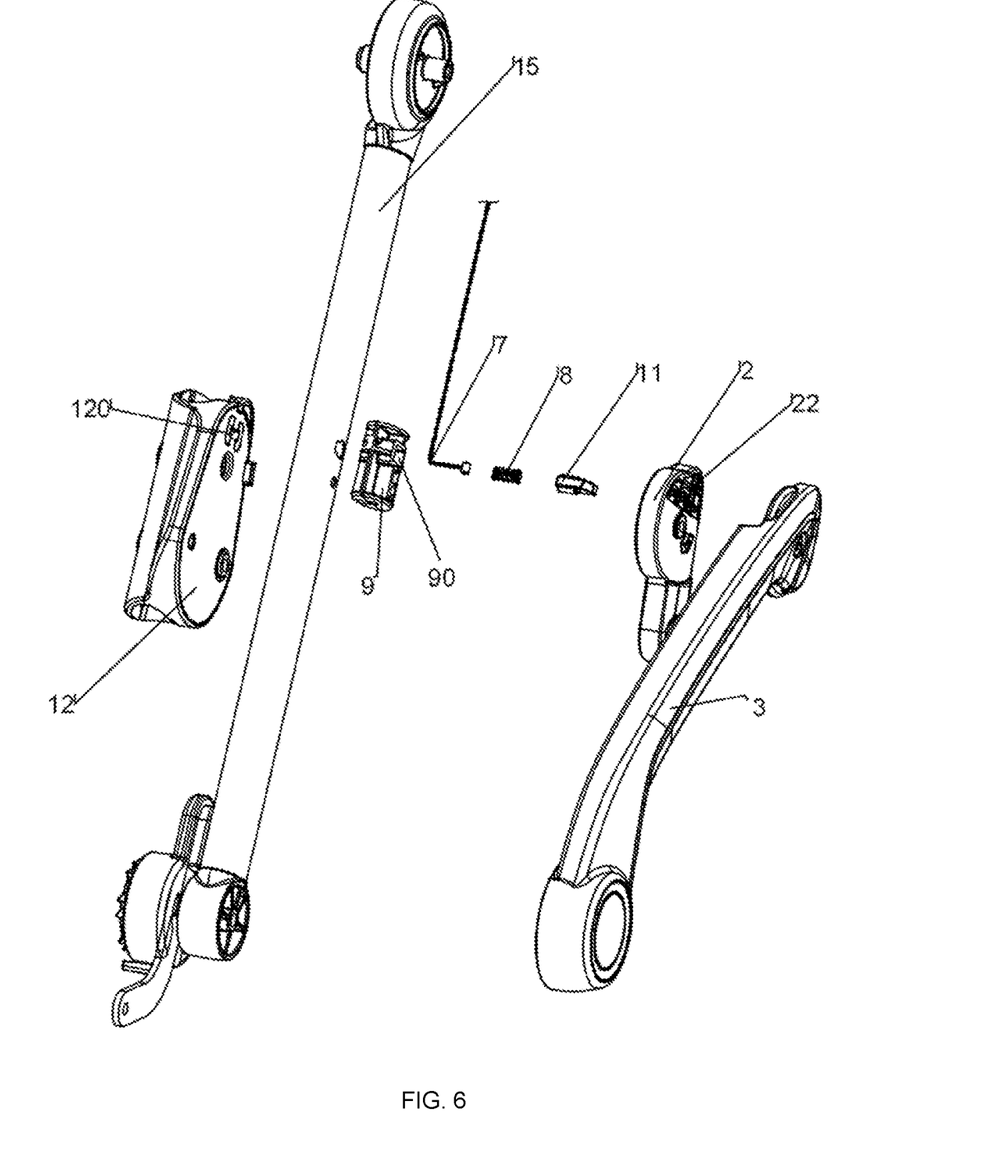
FIG. 6 is an exploded diagram of the handle assembly and the handrail assembly provided in an embodiment of the present disclosure.
Figure 7:
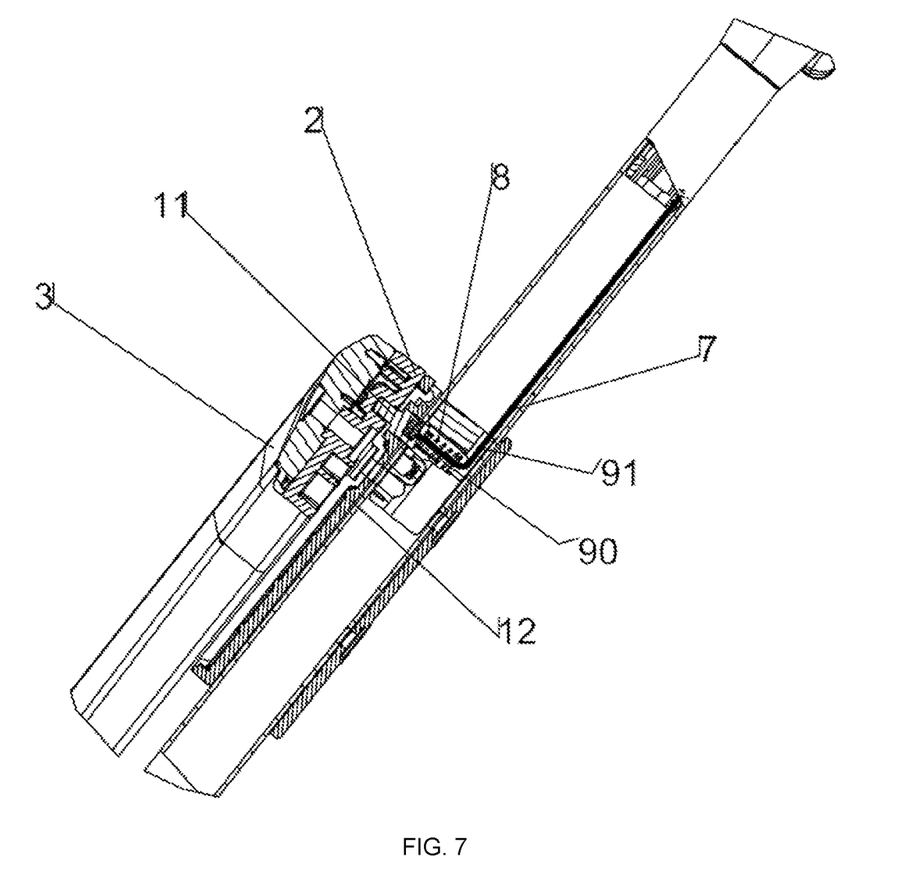
FIG. 7 is a partial sectional view of the handle assembly and the handrail assembly in FIG. 5.

As shown in FIG. 1-FIG. 4, a stroller frame provided in the present embodiment includes a handle assembly 1, a stroller folding mechanism 2, a handrail assembly 3, a front foot assembly 4, a rear foot assembly 5, a seat assembly 6, and an unlocking mechanism 7; a first rotating shaft 20 and a second rotating shaft 21 are provided at intervals on the stroller folding mechanism 2, wherein the stroller folding mechanism 2 is hinged to the handle assembly 1 through the first rotating shaft 20, and the stroller folding mechanism 2 is hinged to one end of the handrail assembly 3 through the second rotating shaft 21; the handle assembly 1 is hinged to the rear foot assembly 5 through a third rotating shaft 10, the rear foot assembly 5 is provided with a fourth rotating shaft 50, and one end of the handrail assembly 3 away from the stroller folding mechanism 2 and one end of the front foot assembly 4 are both hinged to the rear foot assembly 5 through the fourth rotating shaft 50; the seat assembly 6 has one side hinged to the handle assembly 1 through a fifth rotating shaft 60, and the other side hinged to the front foot assembly 4 through a sixth rotating shaft 61; as shown in FIG. 5-FIG. 7, a locking mechanism 11 is provided on the handle assembly 1, wherein the locking mechanism 11 and the first rotating shaft 20 are arranged at intervals, a locking portion 22 matched with the locking mechanism 11 is provided on the stroller folding mechanism 2, and wherein the locking mechanism 11 is configured to be connected with the locking portion 22 when the stroller frame is unfolded, so as to limit rotation of the stroller folding mechanism 2 about the first rotating shaft 20 relative to the handle assembly 1; and the unlocking mechanism 7 is connected to the locking mechanism 11, for driving the locking mechanism 11 away from the locking portion 22, so as to unlock the locking mechanism 11 and the locking portion 22.

Figure 1:
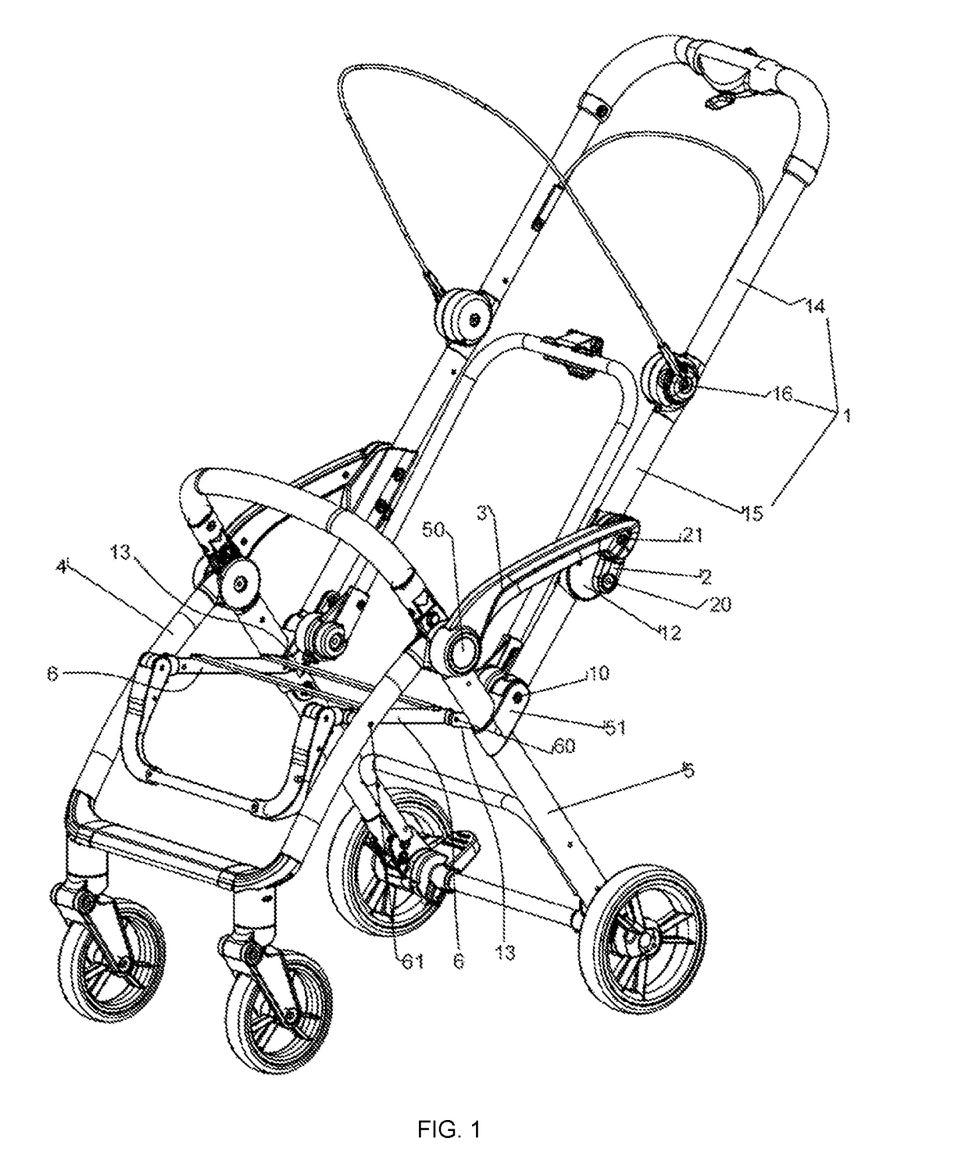
FIG. 1 is a structural schematic diagram of a stroller frame provided in an embodiment of the present disclosure when being unfolded.
Figure 2:
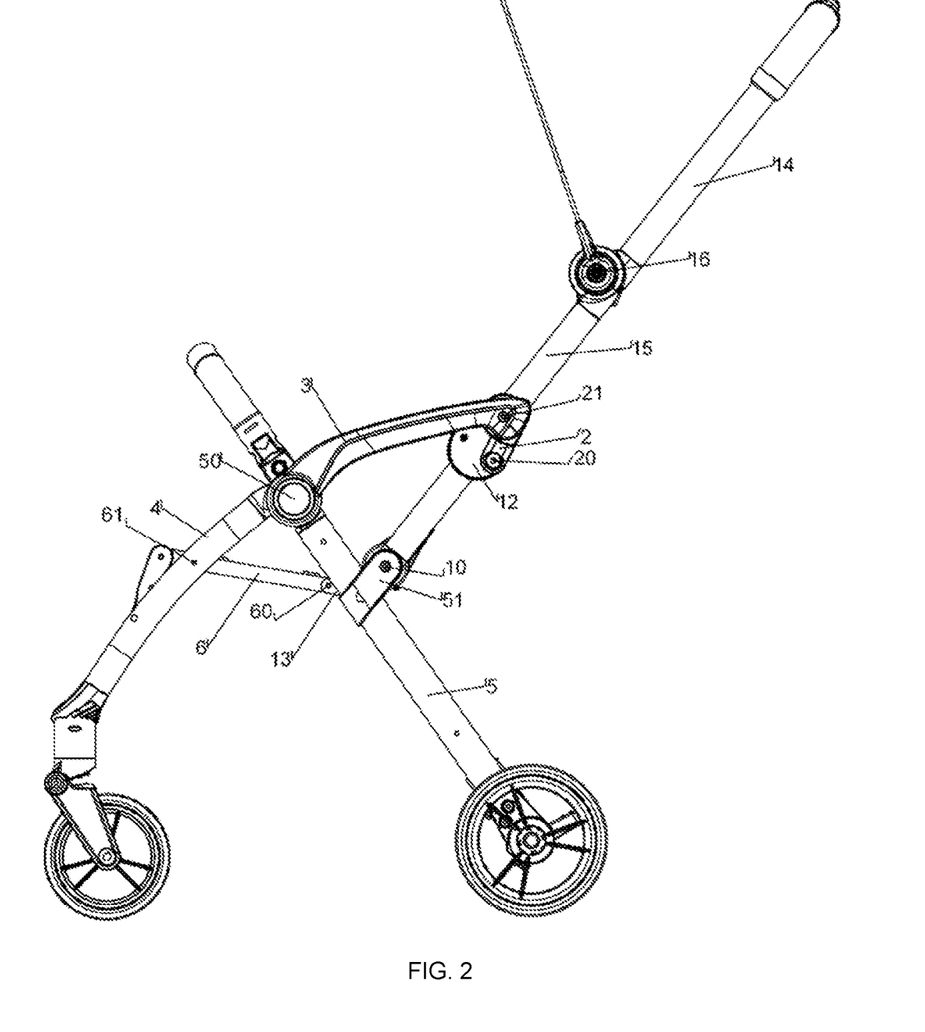
FIG. 2 is a side view of the stroller frame provided in an embodiment of the present disclosure when being unfolded.

As shown in FIG. 2, FIG. 3, and FIG. 4, in the stroller frame, generally, taking the rear foot assembly 5 as a dividing line, the stroller folding mechanism 2, the handle assembly 1, and the handrail assembly 3 are provided on one side of the rear foot assembly 5, and the seat assembly 6 and the front foot assembly 4 are provided on the other side of the rear foot assembly 5. As shown in FIG. 1 and FIG. 2, in the stroller frame provided in the present embodiment, when the stroller frame is unfolded, the stroller folding mechanism 2, the handle assembly 1, the rear foot assembly 5, and the handrail assembly 3 can form a quadrilateral structure with the first rotating shaft 20, the second rotating shaft 21, the third rotating shaft 10, and the fourth rotating shaft 50 as vertices; and the handle assembly 1, the rear foot assembly 5, the seat assembly 6, and the front foot assembly 4 can form a quadrilateral structure with the third rotating shaft 10, the fourth rotating shaft 50, the fifth rotating shaft 60, and the sixth rotating shaft 61 as vertices.

When the stroller frame is unfolded, as shown in FIG. 1, FIG. 2, and FIG. 7, the locking mechanism 11 is connected to the locking portion 22, so that rotation of the stroller folding mechanism 2 about the first rotating shaft 20 relative to the handle assembly 1 can be limited, in this case, degree of freedom at the first rotating shaft 20 is limited, the first rotating shaft 20 cannot rotate, and the stroller folding mechanism 2 cannot rotate. After the rotating function of the first rotating shaft 20 is lost, the quadrangle formed by connecting the first rotating shaft 20, the second rotating shaft 21, the third rotating shaft 10, and the fourth rotating shaft 50 is changed into a triangle formed by connecting the second rotating shaft 21, the third rotating shaft 10, and the fourth rotating shaft 50, in this case, the handle assembly 1, the rear foot assembly 5, and the handrail assembly 3 can form a triangle-like structure. As the stability of the triangle is the best and neither the stroller folding mechanism 2 nor the first rotating shaft can rotate, the effect of locking the handle assembly 1, the rear foot assembly 5, and the handrail assembly 3 can be achieved.

Moreover, as both the handle assembly 1 and the rear foot assembly 5 are locked, the handle assembly 1 cannot rotate, and the third rotating shaft 10 cannot rotate either, in this case, after the rotating function of the third rotating shaft 10 is lost, the quadrangle formed by connecting the third rotating shaft 10, the fourth rotating shaft 50, the fifth rotating shaft 60, and the sixth rotating shaft 61 is changed into a triangle formed by connecting the fourth rotating shaft 50, the fifth rotating shaft 60, and the sixth rotating shaft 61, and the rear foot assembly 5, the seat assembly 6, and the front foot assembly 4 can form a triangle-like structure. As the stability of the triangle is the best and neither the handle assembly 1 nor the third rotating shaft 10 can rotate, the effect of locking the rear foot assembly 5, the seat assembly 6, and the front foot assembly 4 can be achieved. So far, the whole structure of the stroller frame is locked, and can be kept stable in an unfolded state.

When the stroller frame needs to be folded, as shown in FIG. 3-FIG. 4, the rear foot assembly 5 can be first kept upright, and then the unlocking mechanism 7 is used to drive the locking mechanism 11 away from the locking portion 22, so that the locking mechanism 11 and the locking portion 22 are unlocked, in this case, the degree of freedom of the first rotating shaft 20 is no longer restricted, and the first rotating shaft 20 can rotate. As the stroller folding mechanism 2, the handle assembly 1, the rear foot assembly 5, and the handrail assembly 3 form the quadrilateral structure with the first rotating shaft 20, the second rotating shaft 21, the third rotating shaft 10, and the fourth rotating shaft as vertices, and the handle assembly 1, the rear foot assembly 5, the seat assembly 6, and the front foot assembly 4 form a quadrilateral structure with the third rotating shaft 10, the fourth rotating shaft 50, the fifth rotating shaft 60, and the sixth rotating shaft 61 as vertices, after the degree of freedom of the first rotating shaft 20 is no longer restricted, the two quadrilateral structures above can be respectively folded automatically on the two sides of the rear foot assembly 5 due to their own gravity, and thus, the automatic stroller folding function can be achieved when the frame is kept standing.

Compared with the prior art, for the stroller frame provided in the present embodiment, the stroller folding mechanism 2 and the first rotating shaft 20 can be unlocked through driving the locking mechanism 11 to move away from the locking portion 22 by the unlocking mechanism 7, thus all the rotating shafts of the stroller frame can be unlocked, so that the handle assembly 1, the stroller folding mechanism 2, the handrail assembly 3, the front foot assembly 4, the rear foot assembly 5, and the seat assembly 6 of the stroller frame can all rotate freely, and can be automatically folded on two sides of the rear foot assembly when the rear foot assembly 5 is kept upright, further achieving the function of unlocking through one-hand operation and then automatically folding the stroller through self-weight of the frame, and the user does not need to perform the unlocking simultaneously with two hands, which can improve the convenience of operation.

In practical applications, the locking mechanism 11 and the locking portion 22 may be of various structure forms, for example, the locking mechanism 11 and the locking portion 22 may be a hook and a hook hole respectively, wherein the hook can be rotatably mounted on the handle assembly 1, and the hook hole can be provided on the stroller folding mechanism 2. The unlocking mechanism 7 can drive the hook to rotate on the handle assembly 1, so as to achieve hooking or separation between the hook and the hook hole, thereby achieving locking and unlocking between the locking mechanism 11 and the locking portion 22.

While in the present embodiment, as shown in FIG. 6 and FIG. 7, the locking mechanism 11 is an insertion member, the locking portion 22 is a slot, and the insertion member is slidably mounted on the handle assembly 1 along a direction parallel to the first rotating shaft 20.

When slidably mounting the insertion member on the handle assembly 1 along the direction parallel to the first rotating shaft 20, after the insertion member is inserted into the slot, the insertion member can abut against the slot so as to limit movement of the insertion member along a radial direction and a circumferential direction of the first rotating shaft 20, thus the rotation of the stroller folding mechanism 2 and the rotation of the first rotating shaft 20 can be limited; when the insertion member is driven by the unlocking mechanism 7 to exit the slot, the locking of the stroller folding mechanism 2 and the first rotating shaft 20 can be released, in this case, both the first rotating shaft 20 and the stroller folding mechanism 2 can rotate.

As shown in FIG. 6 and FIG. 7, an elastic member 8 is connected between the insertion member and the handle assembly 1, and the elastic member 8 is configured to store energy when the insertion member exits the slot.

The elastic member 8 can function with its own elasticity to restore the insertion member, specifically, when the user drives the insertion member to exit the slot by the unlocking mechanism 7, the elastic member 8 is compressed and store energy; after the user releases the unlocking mechanism 7, the insertion member is no longer stressed, in this case, the elastic member 8 releases energy under the effect of elastic recovery and drives the insertion member to reset, so that the elastic member 8 can re-enter the slot when the stroller frame is unfolded again, achieving locking of the stroller frame.

In the above, a spring can be used as the elastic member 8, and specifically, a spiral spring can be used as the elastic member 8.

In the present embodiment, the unlocking mechanism 7 can be of a structure such as a push rod or a pull rod, and in order to improve the convenience of operation of the unlocking mechanism 7, in the present embodiment, the unlocking mechanism 7 is preferably a pull rope, the handle assembly 1 is preferably of a hollow structure, wherein the pull rope is arranged in the handle assembly 1, one end of the pull rope is connected to the insertion member, and the other end is arranged at a top portion of the handle assembly 1.

As the top portion of the handle assembly 1 is usually provided with a holding portion which is convenient for the user to hold the stroller, when the unlocking mechanism 7 is a pull rope and the other end of the pull rope is arranged at the top portion of the handle assembly 1, it is convenient for the user to unlock the locking mechanism 11 and the locking portion 22 by the unlocking mechanism 7 when standing, without the need of bending down to operate the unlocking mechanism 7.

In order to make it convenient for the user to pull the pull rope and pull the pull rope repeatedly, the top portion of the handle assembly 1 can be provided with a through hole through which the pull rope can pass, wherein an end of the pull rope provided at the top portion of the handle assembly 1 can pass through the above through hole and then be connected to a pull block, and the pull block can abut against an outer side of the top portion of the handle assembly 1.

As shown in FIG. 6 and FIG. 7, the stroller frame provided in the present embodiment further includes a guiding member 9, the handle assembly 1 is hollow, and the guiding member 9 is fixed in the handle assembly 1; one side of the guiding member 9 facing the locking portion 22 is provided with a groove 90, a side wall of the handle assembly 1 is provided with a through hole in communication with the groove 90, one end of the insertion member is arranged in the groove 90, and the other end can protrude out of the handle assembly 1 or retract into the handle assembly 1 after passing through the through hole of the handle assembly 1.

The guiding member 9 is configured to support the insertion member, and can guide a moving process of the insertion member in the process of the insertion member entering and exiting the slot, thereby improving the usage stability of the insertion member.

Further, as shown in FIG. 7, a guiding channel 91 is provided from a bottom of the groove 90 to a side of the guiding member 9 facing back to the locking portion 22, wherein one end of the pull rope is connected to the insertion member, and the other end passes through the guiding channel 91 and then is provided at the top portion of the handle assembly 1.

The guiding channel 91 can provide support for the pull rope, so that the process of the pull rope pulling the insertion member to move is more stable, and the operation smoothness of the stroller frame can be improved.

As shown in FIG. 2, FIG. 3, and FIG. 6, a stroller folding holder 12 is fixed on the handle assembly 1, and the stroller folding mechanism 2 is hinged to the stroller folding holder 12 through the first rotating shaft 20; the stroller folding holder 12 is provided with an exposed hole 120 corresponding to the locking mechanism 11, and the locking mechanism 11 can pass through the exposed hole 120 of the stroller folding holder 12 and then be connected to the locking portion 22.

In the present embodiment, the stroller folding holder 12 can be of a tubular shape, and the stroller folding holder 12 is sheathed outside the handle assembly 1, and can be fixed to the handle assembly 1 by fasteners such as screws.

The stroller folding holder 12 not only can cooperate with the guiding member 9 to provide stable support for the locking mechanism 11 and protect the locking mechanism 11, but also can provide support for the stroller folding mechanism 2 and the first rotating shaft 20, thus improving the installation and usage stability of the stroller folding mechanism 2, the first rotating shaft 20, and the locking mechanism 11.

As shown in FIG. 1-FIG. 4, a handle connecting member 51 is fixed on the rear foot assembly 5, and the handle assembly 1 is hinged to the handle connecting member 51 through the third rotating shaft 10.

The handle connecting member 51 can be fixed on the rear foot assembly 5 by fasteners such as screws, the handle connecting member 51 not only can provide support for the third rotating shaft 10, but also can prevent the handle assembly 1 and the rear foot assembly 5 from interfering with each other when the handle assembly 1 is folded on one side of the rear foot assembly 5, thereby improving the smoothness of the folding process of the handle assembly 1.

As shown in FIG. 1 and FIG. 2, one end of the handle assembly 1 is fixed with a support member 13, and one side of the seat assembly 6 is hinged to the support member 13 through the fifth rotating shaft 60.

As shown in FIG. 1, one end of the support member 13 can be fixed to one end of the handle assembly 1 close to the rear foot assembly 5, in this case, the fifth rotating shaft 60 can be mounted to the other end of the support member 13, so that one side of the seat assembly 6 is hinged to one end of the support member 13 away from the handle assembly 1 through the fifth rotating shaft 60.

The support member 13 is configured to extend a length of the handle assembly 1, which not only facilitates supporting the seat assembly 6, but also can prevent interference between the seat assembly 6 and the handle assembly 1 when they are respectively folded on two sides of the rear foot assembly 5, thus improving the smoothness of the folding process of the seat assembly 6 and the handle assembly 1.

In the above, the support member 13 may be made of a metal sheet, and specifically, may be made of an iron sheet.

As shown in FIG. 1-FIG. 4, the handle assembly 1 in the present embodiment may include an upper handle rod 14 and a lower handle rod 15, and the upper handle rod 14 and the lower handle rod 15 are hinged through a seventh rotating shaft 16. In this case, the stroller folding mechanism 2 in the present embodiment is hinged to the lower handle rod 15 through the first rotating shaft 20, the lower handle rod 15 is hinged to the rear foot assembly 5 through the third rotating shaft 10, and one side of the seat assembly 6 is hinged to the lower handle rod 15 through the fifth rotating shaft 60. An end of the pull rope away from the locking mechanism 11 in the present embodiment is provided at a top portion of the upper handle rod 14.

When the stroller frame is ensured to be unfolded, in order to guarantee stability of the handle assembly 1 after the unfolding, a locking structure can be mounted between the upper handle rod 14 and the lower handle rod 15, and the locking structure is configured to limit relative rotation between the upper handle rod 14 and the lower handle rod 15. Further, an unlocking button further can be provided at a position of the top portion of the upper handle rod 14 where the pull rope is provided, and the locking structure can be connected to the unlocking button provided at the top portion of the upper handle rod 14 through a pull wire. After the unlocking button is pressed, the unlocking button can bring the pull wire to move, thereby driving the above locking structure to be unlocked, so that the upper handle rod 14 can rotate relative to the lower handle rod 15 to be folded on one side of the lower handle rod 15.

In the above, the locking structure and the unlocking button between the upper handle rod 14 and the lower handle rod 15 can use the locking structure and the unlocking button used on existing stroller, and specific structures and connection relationships thereof will not be elaborated herein.

It should be noted that when the stroller frame needs to be folded, the user can press the unlocking button with one hand and pull the pull rope, so that the locking structure between the upper handle rod 14 and the lower handle rod 15 is unlocked, and the unlocking mechanism 7 and the locking portion 22 are unlocked, then the user can hold the rear foot assembly 5, so that the rear foot assembly 5 is kept upright, then the upper handle rod 14 can be automatically folded on one side of the lower handle rod 15 under the action of its own weight, the lower handle rod 15 is further automatically folded on one side of the rear foot assembly 5 under the action of its own weight, and meanwhile, the front foot assembly 4 is automatically folded on the other side of the rear foot assembly 5 under the action of its own weight.

In present embodiment, as shown in FIG. 1 and FIG. 2, the handrail assembly 3 can include a handrail rod, wherein one end of the handrail rod is hinged to the stroller folding mechanism 2 through the second rotating shaft 21, and the other end is hinged to the rear foot assembly 5 through the fourth rotating shaft 50. The rear foot assembly 5 may include an upper surrounding rod and a rear foot rod, and the upper surrounding rod is fixedly connected to the rear foot rod. Moreover, the fourth rotating shaft 50 is provided at a joint of the upper surrounding rod and the rear foot rod, and the lower handle rod 15 can be hinged to the rear foot rod through the third rotating shaft 10, wherein the upper surrounding rod can form a front handrail above the seat assembly 6, and the bottom of the rear foot rod is configured for installing casters. In addition, the front foot assembly 4 may include a front foot rod, wherein a top end of the front foot rod is hinged to the rear foot rod through the fourth rotating shaft 50, and a bottom end of the front foot rod is configured for installing casters.

The present embodiment further provides a stroller, wherein the stroller includes the above stroller frame, therefore, the stroller and the stroller frame can solve the same technical problem and achieve the same beneficial effects, which are not elaborated again.

Finally, it should be explained that the various embodiments above are merely used for illustrating the technical solutions of the present disclosure, rather than limiting the present disclosure; although the detailed description is made to the present disclosure with reference to various preceding embodiments, those ordinarily skilled in the art should understand that they still could modify the technical solutions recited in various preceding embodiments, or make equivalent substitutions to some or all of the technical features therein; and these modifications or substitutions do not make the corresponding technical solutions essentially depart from the scope of the technical solutions of various embodiments of the present disclosure.

What is claimed is:

1. A stroller frame, comprising a handle assembly, a stroller folding mechanism, a handrail assembly, a front foot assembly, a rear foot assembly, a seat assembly, and an unlocking mechanism;
   wherein a first rotating shaft and a second rotating shaft are provided at intervals on the stroller folding mechanism, wherein the stroller folding mechanism is hinged to the handle assembly through the first rotating shaft, and the stroller folding mechanism is hinged to one end of the handrail assembly through the second rotating shaft;
   the handle assembly is hinged to the rear foot assembly through a third rotating shaft, wherein the rear foot assembly is provided with a fourth rotating shaft, and one end of the handrail assembly away from the stroller folding mechanism and one end of the front foot assembly are both hinged to the rear foot assembly through the fourth rotating shaft;
   one side of the seat assembly is hinged to the handle assembly through a fifth rotating shaft, and the other side is hinged to the front foot assembly through a sixth rotating shaft;
   a locking mechanism is provided on the handle assembly, wherein the locking mechanism and the first rotating shaft are arranged at intervals, a locking portion matched with the locking mechanism is provided on the stroller folding mechanism, and the locking mechanism is configured to be connected to the locking portion when the stroller frame is unfolded, so as to limit a rotation of the stroller folding mechanism about the first rotating shaft relative to the handle assembly; and
   the unlocking mechanism is connected to the locking mechanism, for driving the locking mechanism away from the locking portion, so as to unlock the locking mechanism and the locking portion.

2. The stroller frame according to claim 1, wherein the locking mechanism is an insertion member, the locking portion is a slot, and the insertion member is slidably mounted on the handle assembly along a direction parallel to the first rotating shaft.

3. The stroller frame according to claim 2, wherein an elastic member is connected between the insertion member and the handle assembly, and the elastic member is configured to store energy when the insertion member exits the slot.

4. The stroller frame according to claim 3, wherein a stroller folding holder is fixed on the handle assembly, and the stroller folding mechanism is hinged to the stroller folding holder through the first rotating shaft; and
   the stroller folding holder is provided with an exposed hole corresponding to the locking mechanism, and the locking mechanism, after passing through the exposed hole of the stroller folding holder, can be connected to the locking portion.

5. The stroller frame according to claim 3, wherein a handle connecting member is fixed on the rear foot assembly, and the handle assembly is hinged to the handle connecting member through the third rotating shaft.

6. The stroller frame according to claim 2, wherein the unlocking mechanism is a pull rope; and
   the handle assembly is of a hollow structure, and the pull rope is arranged in the handle assembly, wherein one end of the pull rope is connected to the insertion member, and the other end is arranged at a top portion of the handle assembly.

7. The stroller frame according to claim 6, wherein a stroller folding holder is fixed on the handle assembly, and the stroller folding mechanism is hinged to the stroller folding holder through the first rotating shaft; and
   the stroller folding holder is provided with an exposed hole corresponding to the locking mechanism, and the locking mechanism, after passing through the exposed hole of the stroller folding holder, can be connected to the locking portion.

8. The stroller frame according to claim 6, wherein a handle connecting member is fixed on the rear foot assembly, and the handle assembly is hinged to the handle connecting member through the third rotating shaft.

9. The stroller frame according to claim 6, further comprising a guiding member, wherein the handle assembly is hollow, and the guiding member is fixed in the handle assembly; and
   one side of the guiding member facing the locking portion is provided with a groove, and a side wall of the handle assembly is provided with a through hole in communication with the groove, wherein one end of the insertion member is arranged in the groove, and the other end, after passing through the through hole of the handle assembly, can protrude out of the handle assembly or retract into the handle assembly.

10. The stroller frame according to claim 9, wherein a stroller folding holder is fixed on the handle assembly, and the stroller folding mechanism is hinged to the stroller folding holder through the first rotating shaft; and
    the stroller folding holder is provided with an exposed hole corresponding to the locking mechanism, and the locking mechanism, after passing through the exposed hole of the stroller folding holder, can be connected to the locking portion.

11. The stroller frame according to claim 9, wherein a handle connecting member is fixed on the rear foot assembly, and the handle assembly is hinged to the handle connecting member through the third rotating shaft.

12. The stroller frame according to claim 9, wherein a guiding channel is provided from a bottom of the groove to a side of the guiding member facing back to the locking portion, wherein one end of the pull rope is connected to the insertion member, and the other end, after passing through the through hole of the handle assembly, is arranged at the top portion of the handle assembly.

13. The stroller frame according to claim 12, wherein a stroller folding holder is fixed on the handle assembly, and the stroller folding mechanism is hinged to the stroller folding holder through the first rotating shaft; and the stroller folding holder is provided with an exposed hole corresponding to the locking mechanism, and the locking mechanism, after passing through the exposed hole of the stroller folding holder, can be connected to the locking portion.

14. The stroller frame according to claim 12, wherein a handle connecting member is fixed on the rear foot assembly, and the handle assembly is hinged to the handle connecting member through the third rotating shaft.

15. The stroller frame according to claim 2, wherein a stroller folding holder is fixed on the handle assembly, and the stroller folding mechanism is hinged to the stroller folding holder through the first rotating shaft; and the stroller folding holder is provided with an exposed hole corresponding to the locking mechanism, and the locking mechanism, after passing through the exposed hole of the stroller folding holder, can be connected to the locking portion.

16. The stroller frame according to claim 2, wherein a handle connecting member is fixed on the rear foot assembly, and the handle assembly is hinged to the handle connecting member through the third rotating shaft.

17. The stroller frame according to claim 1, wherein a stroller folding holder is fixed on the handle assembly, and the stroller folding mechanism is hinged to the stroller folding holder through the first rotating shaft; and the stroller folding holder is provided with an exposed hole corresponding to the locking mechanism, and the locking mechanism, after passing through the exposed hole of the stroller folding holder, can be connected to the locking portion.

18. The stroller frame according to claim 1, wherein a handle connecting member is fixed on the rear foot assembly, and the handle assembly is hinged to the handle connecting member through the third rotating shaft.

19. The stroller frame according to claim 1, wherein one end of the handle assembly is fixed with a support member, and one side of the seat assembly is hinged to the support member through the fifth rotating shaft.

20. A stroller, comprising the stroller frame according to claim 1.

* * * * *